No. 874,363. PATENTED DEC. 17, 1907.
F. L. IRWIN.
TANK CAR.
APPLICATION FILED OCT. 4, 1907.
5 SHEETS—SHEET 1.
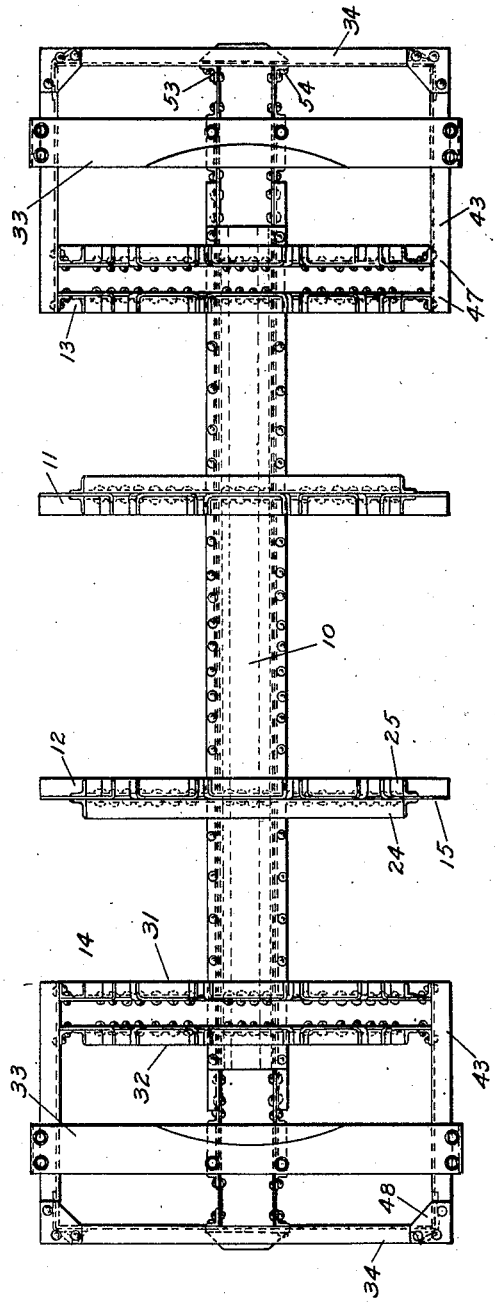
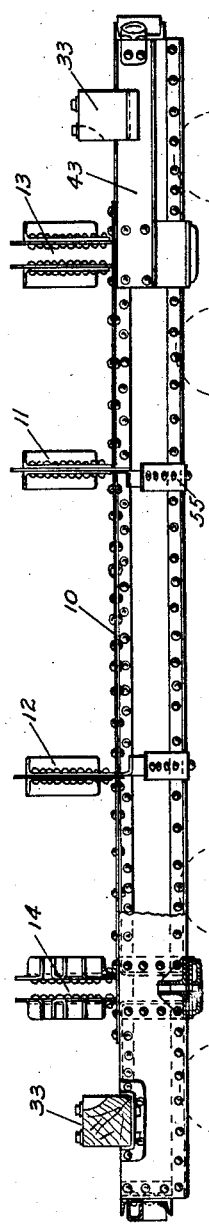
WITNESSES:
INVENTOR.
FRANK L. IRWIN
BY
ATTORNEY.

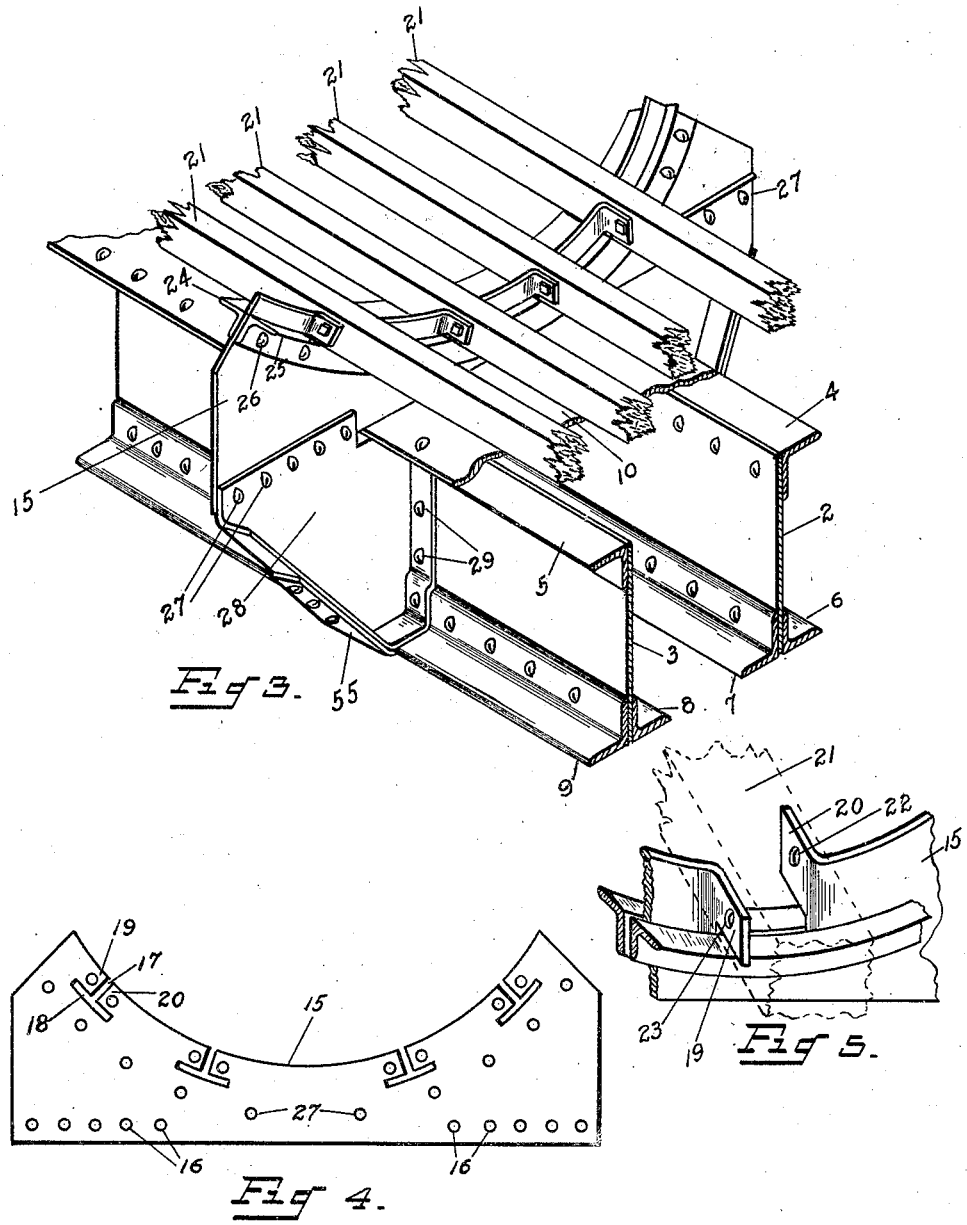

No. 874,363.

PATENTED DEC. 17, 1907.

F. L. IRWIN.
TANK CAR.
APPLICATION FILED OCT. 4, 1907.

5 SHEETS—SHEET 3.

WITNESSES:

INVENTOR.
FRANK L IRWIN
BY
ATTORNEY.

No. 874,363.

PATENTED DEC. 17, 1907.

F. L. IRWIN.
TANK CAR.
APPLICATION FILED OCT. 4, 1907.

5 SHEETS—SHEET 4.

WITNESSES:

INVENTOR.
FRANK L. IRWIN
BY
ATTORNEY.

No. 874,363.

PATENTED DEC. 17, 1907.

F. L. IRWIN.
TANK CAR.
APPLICATION FILED OCT. 4, 1907.

5 SHEETS—SHEET 5.

WITNESSES:

INVENTOR.
FRANK L. IRWIN
BY
ATTORNEY.

UNITED STATES PATENT OFFICE.

FRANK L. IRWIN, OF COLUMBUS, OHIO, ASSIGNOR TO THE RALSTON STEEL CAR COMPANY, OF COLUMBUS, OHIO, A CORPORATION OF OHIO.

TANK-CAR.

No. 874,363.   Specification of Letters Patent.   Patented Dec. 17, 1907.

Application filed October 4, 1907. Serial No. 395,940.

*To all whom it may concern:*

Be it known that FRANK L. IRWIN, a citizen of the United States, residing at Columbus, in the county of Franklin and State of Ohio, has invented certain new and useful Improvements in Tank-Cars, of which the following is a specification.

My invention relates to improvements in tank cars, especially in tank cars of the kind shown in my Patent No. 864,377 issued August 27, 1907.

It contemplates improvements in the construction for maintaining the tank block in operative position, whereby said construction is greatly strengthened; it further contemplates improvements in the construction of the underframe adjacent the ends thereof, whereby said end construction is strengthened, simplified and cheapened; it further contemplates improvements in the tank saddle at the bolster and at the cross bearer; it further contemplates improvements in the construction of the center sill, whereby the same is strengthened and cheapened.

The foregoing and other objects are contemplated by my improvements all of which will be clearly set forth in the description and claims.

Figure 6:
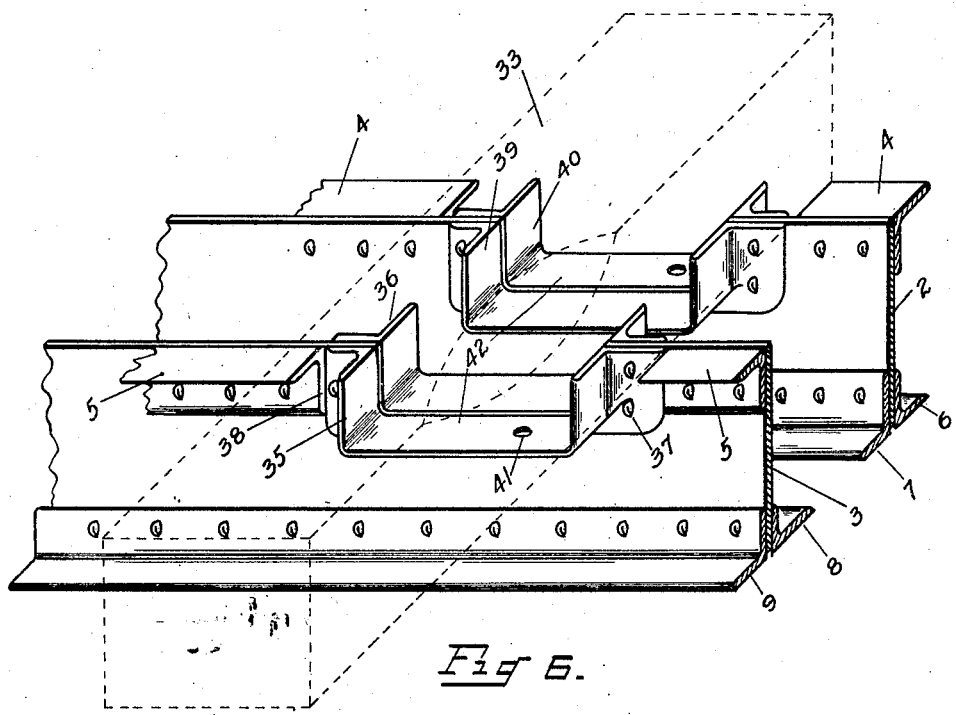
Figure 7:
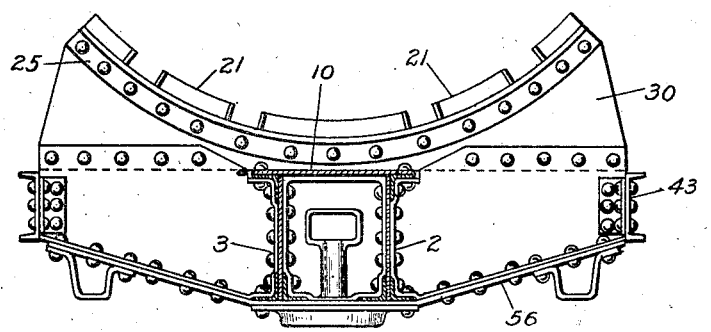
Figure 8:
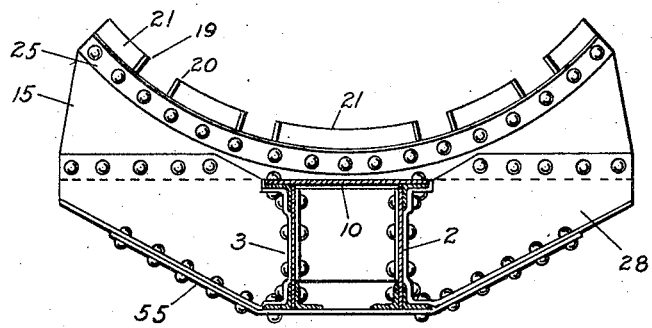
Figure 9:
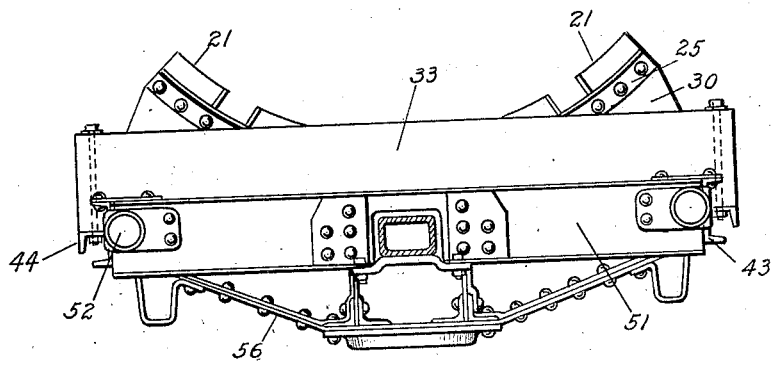
Figure 10:
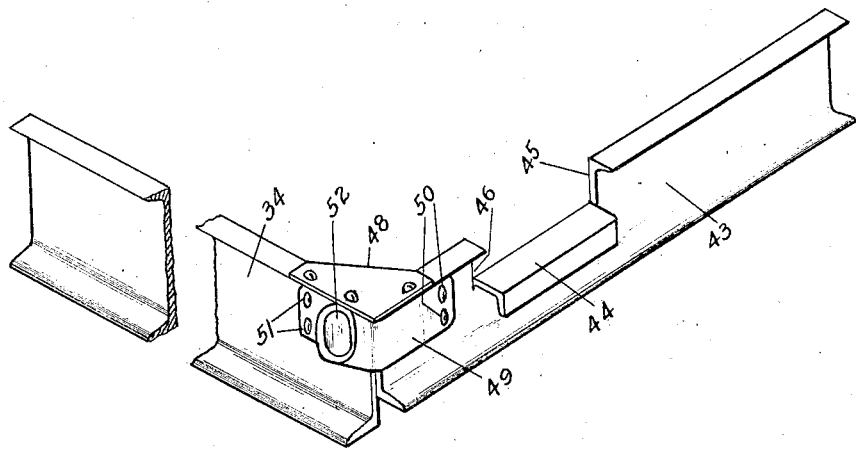

In the drawings which are hereto attached and hereby made a part of this specification, Figure 1 is a side view partly in section of the underframe construction of the tank car; Fig. 2 is an upper plan view of the underframe construction; Fig. 3 is a perspective of the construction at a cross-bearer; Fig. 4 is a view showing the development of the tank saddle; Fig. 5 is a view of the construction of the tank saddle at the point where the wooden bearings for the tank are positioned; Fig. 6 is a view of the reinforcing construction for positioning the tank block in the center sill; Fig. 7 is a vertical transverse section at a bolster; Fig. 8 is a vertical transverse section at cross-bearer; Fig. 9 is an end view of the underframe; Fig. 10 is a view showing one corner of the underframe construction, illustrating the slitting of the side sill for seating the tank block, and also the arrangement of the push pocket.

Inasmuch as all of my improvements are features of the underframe construction, I have not deemed it necessary to illustrate a tank, inasmuch as the position and arrangement of the tank will be readily understood; further, I have not deemed it necessary to illustrate the trucks, except the outline of the wheels.

Referring to the drawings, 1 designates the center sill construction, which is clearly disclosed in Fig. 3, in which it appears that the center sill is made up preferably of two webs 2 and 3, having riveted on the outer side thereof adjacent their upper edges the angles 4 and 5, and having riveted at their lower edges on opposite sides thereof the angles 6, 7, 8, and 9; the angles which are riveted to the lower edge of each web are made wide for the purpose of giving a firm support to the web, and the angle riveted along the upper edge of the web is also made wide for the purpose of giving adequate support to the cover plate 10 upon which the tank supports are positioned. The wide angles also afford larger supporting bases for the diaphragm plates which will hereafter be described, whereby the underframe construction is greatly strengthened. The cover plate 10 is placed on top of the built-up center sill just described, and is riveted to the outwardly extending flanges of the angles secured adjacent the upper edges of the center sill webs, as described. The cover plate is not carried to the extreme ends of the underframe, for the reason that the tank block is let into the center sill construction, and for the further reason that it is not deemed essential in my construction to continue the cover plate completely to the end.

At intervals on the center sill, there are located cross-bearers 11, 12, and over the trucks are provided bolsters 13 and 14. The cross-bearer construction is clearly disclosed in Figs. 3, 4 and 5, in which 15 is the tank saddle, formed of the plate shown in Fig. 4; a plate of metal is cut to conform essentially to the outline of Fig. 4, and rivet holes shown generally at 16 are made therethrough; a portion of the plate is then cut or stamped out forming the inwardly extending recess 17, and the transverse recess 18, said recesses forming essentially a T-shaped opening in the plate, leaving the extensions 19 and 20 at the sides of the recess 17 and above the recess 18. The extensions 19 and 20 are then preferably bent at a right angle with the plane of the plate, as appears in Fig. 5; both extensions may be bent in the same direction if desired, or in opposite directions, as shown in Fig. 5, the latter construction giving greater support to the wooden bearing strip 21 for the tank which is placed between said extensions after they are bent at a right angle, and which is secured thereto by rivets inserted through the rivet holes shown at 22 and 23. The bearing strips 21 are braced against a lateral or a twisting movement by the said extensions 19 and 20, and they rest upon the lower edge of the transverse recess 18; they are further supported from beneath, and the general construction at the cross-bearer is also further strengthened, by the angles 24 and 25, which are bent to conform to the curvature of the upper edge of the plate 15, and are secured thereto by the rivets 26 inserted through the curved row of rivet holes shown generally at 27 in Fig. 4. It will be noted that the tank saddle 15 is a continuous plate cut to the degree of curvature required upon its upper edge and slit and bent as shown in Figs. 4 and 5 especially for the purpose of receiving the wooden bearing strips, and bracing the same against a lateral or twisting movement; and said plate is further provided with the angles at each side adjacent its upper edge, whereby the tank saddle is greatly strengthened, and the wooden bearing strips 21 are more firmly supported.

Adjacent each end of its lower edge the tank saddle plate 15 is provided with the rivet holes 16 for the reception of the rivets 27 to secure said tank saddles to the cross-bearer diaphragm 28. The diaphragm 28 is flanged in the manner shown generally in my patent hereinbefore mentioned, and is shaped to adapt itself to the contour of the outer side of one of the built up members forming the center sill, to which it is riveted at 29, as appears clearly in Fig. 3. The diaphragm 28 therefore fits snugly against the center sill web and the angles riveted thereto, and its upper edge is riveted to the tank saddle plate 15, as described, thereby forming a very strong construction at the ends of the tank saddle to support the same. The cross-bearer diaphragms are further strengthened and supported by the diaphragm plate 55, secured at its ends to the flange on the diaphragm, and being positioned beneath the center sill, as appears clearly in Fig. 8; a similar diaphragm plate is shown at the bolster at 56 in Fig. 7, and it is provided for a similar purpose. It will further be noted that the tank saddle plate 15 rests upon the cover plate 10 on the center sill construction, and that preferably a plurality of longitudinal bearing strips 21 are positioned in the upper edge of the tank saddle plate. The bearing strips 21 are shown broken away, and it should be stated that these strips may be made to extend the entire length of the tank, or short strips may be provided at each cross-bearer, and at the bolster, at the desire of the operator. It will be further understood that the order in which the stamping may be done and the rivet holes made in the plate shown in Fig. 4 may be determined by the operator at his pleasure, there being no necessity in the order mentioned above.

It will be seen that the tank saddle is curved appropriately to receive the lower portion of the tank, and to embrace the same, whereby a rolling or lateral motion of the tank is prevented; further, the wooden bearing strips tend to prevent longitudinal movement of the tank and the consequent wearing away of the tank structure. A side view of the cross-bearer is shown in Fig. 8.

At the bolsters 13 and 14, the tank saddle is built up in a similar manner to that described at the cross-bearers; the tank saddle at the bolster is shown in Fig. 7 and designated at 30, and inasmuch as the construction is the same as that described for the tank saddle at the cross-bearer, no further description will be necessary. It will be noted that the wooden bearing strips are positioned at the bolster in the same manner as at the cross-bearer. However, it will further be noted that at the bolster the parts are provided in duplicate as shown clearly in Fig. 2 at 31 and 32, whereby the structure is made much stronger.

In Fig. 6 is shown the construction for positioning the tank block 33; at a preferred point between the bolster and the end sill 34 I seat the tank block 33 in the center sill by slitting down through the center sill webs a preferred distance at separated points on said webs, and then cutting out or bending laterally the portion between the slits, so as to leave in the upper edge of each web a recess, into which the tank block is adapted to be let and to be supported thereby both from beneath and at the forward and rear sides thereof. I then provide a reinforcing construction by bending the angle 35 to make the same conform to the outline of the recess in the upper edge of the center sill web, as appears clearly in Fig. 6.

When the slitted portion is bent laterally as mentioned above, the shelf formed thereby would furnish a support for the tank block, in which case one of the angles hereinafter described may be omitted; however, I prefer to provide an angle at each side of the center sill web, both shaped to conform to the recess formed therein, one of these angles being shown at 35, another at 36. These angles are then secured to the center sill web by rivets shown at 37 and 38. Angles 39 and 40 are also provided in a similar manner on the other center sill web; preferably through the outer of the two angles on a center sill web I provide a bolt hole 41 through which is adapted to be inserted a bolt to secure the tank block to its seat. The foregoing construction is seen to furnish a broad base 42 for the tank block, and also broad and firm supporting walls both rearwardly and forwardly, whereby the tank block is securely positioned and firmly supported. The tank block is further supported in the side sill 43, said side sill being slit down and the slitted portion then bent laterally as shown at 44. This construction provides a broad, strong base for supporting the end of the tank block, and the walls 45 and 46 support the tank block both rearwardly and forwardly. This construction greatly strengthens the tank block and is an improvement over the tank block construction shown in my said patent.

Adjacent the ends of the underframe I provide the side sills, one being indicated at 43, the remaining side sills being formed in a similar manner; as shown in the drawings, the side sill 43 is preferably a channel with the flanges extending outwardly, which is secured at one end to the bolster construction as seen at 47, and at its other end is secured to the end sill 34 in a manner clearly shown in Fig. 10. The end sill and side sill meet at a right angle, and at 48 is shown an angular cover plate riveted to the said sills; I also provide at the junction of the said sills a push pocket 49, secured to the side sill at 50 and to the end sill at 51, forming a tie to secure the said sills together. The push pocket shown at 52, answers a well known purpose, and need not be further described. The end sill 34 is strengthened at its junction with the center sill by the angles 53 and 54, secured to the ends of the center sill webs and to the inner face of the end sill. The end construction of the underframe is thus seen to comprise the bolster, the tank block let into the center sill and the side sills and supported therein both from beneath and forwardly and rearwardly; also the end sill which is firmly secured to the center sill and the side sills. This construction involves the use of fewer parts than are shown in my said patent, and at the same time makes a construction which is firmer and cheaper and more quickly made.

My improvements hereinbefore described consist essentially of a reinforced construction for the support of the tank block; a simplified and strengthened construction for the ends of the underframe; and a simplified and strengthened construction for the tank saddle both at the bolster and at the crossbearer. The object of my improvements is to simplify the construction of a tank car underframe at the points noted, to make the construction of greater strength and durability, and to provide a construction which can be built more rapidly and at less expense.

What I claim is:

1. In a tank car a tank saddle comprising a plate with an upper concave edge having recesses formed therein, the portions of said plate adjacent said recesses being bent at practically a right angle with the plane of the plate, thereby forming a seat and side supports for tank bearing member.

2. In a tank car a tank saddle comprising a plate having an upper concave edge with recesses formed therein at intervals, the portions of said plate adjacent said recesses being bent at practically a right angle with the plane of said plate, and a reinforcing member secured to said plate adjacent the lower edge of said recesses, a tank bearing member adapted to be positioned in each of said recesses upon said reinforcing member and to be supported laterally by said portions of said plate bent at a right angle.

3. In a tank car a tank saddle, comprising a plate member mounted upon the center sill of said car and having a concave upper edge, a plurality of recesses formed in said plate in said concave edge, the portions of said plate adjacent said recesses being adapted to be bent at a right angle with the plane of said plate, a reinforcing member secured upon said plate beneath said bent portions, and a tank bearing member adapted to be positioned in each of said recesses and to be supported from beneath by the lower edge of said recess and said reinforcing members, and adapted to be supported laterally by said bent portions of said plate.

4. In a tank car, a center sill construction having a recess formed in its upper edge, a reinforcing member bent to conform to the contour of said recess mounted upon said center sill construction and adapted to be secured thereto, and a tank block adapted to be let into said recesses to be supported by the lower edge of said recesses and by said reinforcing member from beneath, and adapted to be supported forwardly and rearwardly by the forward and rear edges of said recesses and by the forward and rear portions of said reinforcing member.

5. In a tank car, a center sill construction having a recess formed in the upper edge thereof, a plurality of reinforcing members conforming in contour to the edge of said recess and mounted upon said center sill construction adjacent said recess, and a tank block adapted to be let into said recess and to be supported therein from beneath and upon the forward and rearward sides thereof by the edges of said center sill adjacent said recesses and by said reinforcing member.

6. In a tank car, a center sill construction formed of a plurality of longitudinal members each having a recess formed in its upper edge, a reinforcing member shaped to conform to the contour of said recess mounted upon said center sill members adjacent said recess at each side thereof, and a tank block adapted to be let into said recess and supported therein from beneath and forwardly and rearwardly by the edges of said recess and by said reinforcing members.

7. In a tank car, a center sill construction having a recess formed in its upper edge, reinforcing members mounted adjacent said recess upon said center sill construction, a side sill, a recess formed in the upper edge thereof, a tank block adapted to be let into said recesses in said center sill and said side sill and to be supported therein from beneath and upon its forward and its rear sides by the edges of said recesses and by said reinforcing members.

8. In a tank car underframe, an end construction comprising a center sill, a bolster mounted upon said center sill, an end sill mounted adjacent the end of said center sill, side sills mounted upon the ends of said bolster and said end sill and secured thereto, and a tank block parallel with said bolster and end sill let into said center sill and said side sills and secured thereto.

9. In a tank car underframe, an end construction therefor comprising a center sill, a bolster mounted transversely upon said center sill, an end sill mounted transversely upon said center sill adjacent the end thereof, side sills mounted upon said bolster and end sill and secured thereto, said center sill being formed with a recess in its upper edge and having a reinforcing construction mounted thereon adjacent said recess, each of said side sills being formed with a recess therein, and a tank block positioned on said underframe intermediate said bolster and end sill and adapted to be let into said recess to be supported therein both from beneath and upon its forward and its rear sides, said tank block being secured to said center sill and said side sills.

In testimony whereof I affix my signature in the presence of two witnesses.

FRANK L. IRWIN.

Witnesses:
   GEO. W. RIGHTMIRE,
   A. RAGER.